United States Patent [19]

Sardisco et al.

[11] 4,393,030
[45] Jul. 12, 1983

[54] UPGRADING OF PHOSPHATE ORE

[75] Inventors: John B. Sardisco; Dysart E. Holcomb, both of Shreveport, La.

[73] Assignee: Pennzoil Company, Houston, Tex.

[21] Appl. No.: 338,998

[22] Filed: Jan. 12, 1982

[51] Int. Cl.$^3$ .................. C01F 1/00; C01B 15/16; C01B 25/26
[52] U.S. Cl. .................. 423/167; 423/319; 423/320; 71/37
[58] Field of Search .............. 423/166, 167, 319, 320, 423/317; 71/37

[56] References Cited

U.S. PATENT DOCUMENTS

| | | | |
|---|---|---|---|
| 2,143,865 | 1/1939 | Copson | 23/108 |
| 2,571,866 | 10/1951 | Greene | 241/14 |
| 2,899,292 | 8/1959 | Vickery | 71/41 |
| 2,914,380 | 11/1959 | Vickery | 23/109 |
| 2,954,275 | 9/1960 | Carothers et al. | 23/88 |
| 3,150,957 | 9/1964 | Seymour et al. | 423/319 X |
| 3,391,993 | 7/1968 | Cutter | 23/109 |
| 3,401,014 | 9/1968 | Saeman | 23/109 |
| 3,442,610 | 5/1969 | Mustian, Jr. et al. | 23/165 |
| 3,493,340 | 2/1970 | Bosen et al. | 423/167 |
| 3,619,136 | 11/1971 | Case | 423/166 |
| 3,743,725 | 7/1973 | Case | 423/166 |
| 3,792,151 | 2/1974 | Case | 423/166 |
| 3,919,395 | 11/1975 | Hauge | 423/309 |
| 4,029,743 | 6/1977 | Hauge | 423/320 |
| 4,042,666 | 8/1977 | Rice et al. | 423/167 |
| 4,086,322 | 4/1978 | Drechsel | 423/158 |
| 4,105,749 | 8/1978 | Wilson et al. | 423/320 |
| 4,113,184 | 9/1978 | Loughrie | 241/15 |
| 4,160,657 | 7/1979 | Drechsel | 71/41 |
| 4,309,395 | 1/1982 | Hauge | 423/320 |

FOREIGN PATENT DOCUMENTS

852538 10/1960 United Kingdom .

Primary Examiner—Gregory A. Heller
Attorney, Agent, or Firm—Lowe, King, Price & Becker

[57] ABSTRACT

Phosphate is upgraded to remove slimes therefrom by a process which comprises the steps of:
(a) contacting the phosphate ore with a phosphoric acid solution having a concentration of about 1 to 20 weight percent in a desliming unit for a sufficient time to form a suspension containing the slimes and the calcium and phosphate components;
(b) passing said suspension through a solids separator to separate deslimed phosphate ore from the slime suspension and recovering the deslimed phosphate ore;
(c) removing the slime suspension to a separator to separate the slime solids from the filtrate liquids; and
(d) recycling the filtrate liquids to the desliming unit to provide at least a portion of the phosphoric acid solution.

2 Claims, 5 Drawing Figures

UPGRADING OF PHOSPHATE ORE

CROSS REFERENCE TO RELATED APPLICATIONS

This application is related to commonly assigned application Ser. No. 338,999, filed of even date.

TECHNICAL FIELD

This invention relates to methods for the upgrading of low grade phosphate ore into a form suitable for use as phosphate rock in phosphoric acid processes, and more particularly relates to methods for the conversion of low grade phosphate ore into useful products by removal of slimes therefrom.

BACKGROUND ART

Phosphate rock is any ore that contains one or more phosphatic minerals of sufficient purity and quantity to permit its commercial use as a source of phosphatic compounds or elemental phosphorous. This definition is essentially economic rather than geologic, for if a rock can be utilized for the indicated purpose it is a phosphate rock. Phosphate rock includes two major subdivisions, the first consisting of crystalline rock with enough of the mineral apatite to be of commercial interest in providing a source of calcium and phosphorous. Fluorapatite is calcium fluorophosphate of the formula $Ca_4(PO_4)_6.CaF_2$, and is widely distributed in many kinds of rock. The second consists of sedimentary phosphate rock known as phosphorite, the essential mineral of phosphorite being carbonate apatite. In the art, phosphate rock is essentially synonymous with phosphorite.

Phosphate rock of any type is utilized for its phosphatic content with its physical properties being of no concern except in mining and processing. The phosphate content of the rock or ore is expressed in either of two ways. One is the percentage of Bone phosphate of Lime or "BPL", which is tricalcium phosphate, $Ca_3(PO_4)_2$. The BPL content of beneficiated phosphate rock will generally range from about 50 to 85 percent. The second manner of expressing phosphate content is in terms of phosphorous pentoxide, $P_2O_5$. The ratio of BPL content to $P_2O_5$ content is about 2.18 to 1. Thus, a rock with 60% BPL content contains about 27.5% $P_2O_5$.

As a practical matter, most modern commercial beneficiation plants are designed to process and upgrade phosphate ore to remove slimes and sands so as to provide a phosphate rock in which the BPL content has been uprgraded.

Phosphate rock is obtained from underground mining or surface mining of phosphate ore, the latter initially involving the use of larger drag line excavators which remove the overburden and then recover the crude phosphate ore which is known as "matrix". The matrix is then washed by hydraulic jets in an improvised sump pit and the resulting mixture of phosphate ore, water, sand and gravel, called the "slurry", is then pumped by pipeline to a washing plant. In the washing plant the phosphate ore is sized and concentrated so that an original matrix which could have a BPL content in the range of 20-30% may be upgraded to a phosphate rock having a higher BPL content, e.g. in the range of 70% or higher. In the treatment plant, the matrix is initially washed to provide a pebble product and a flotation feed, with slimes having been removed. The slimes are discarded and the pebble may be suitable for sale or may be blended with other high grade concentrate. Discarding the slimes raises a serious environmental problem as the slimes are simply placed in a slime pond. The flotation feed is passed to a flotation plant where a high-grade concentrate product is separated from sand tailings.

Of the products from the beneficiation plant, only the concentrate will normally have a sufficiently high BPL content to be used in commercial phosphoric acid plants for the production of phosphoric acid and/or the production of other useful materials containing calcium and phosphorous. Accordingly, most phosphoric acid plants are suitable only for handling a feedstock having a relatively high BPL content such as the concentrate product which is obtained from flotation.

There has been substantial work in the art in an effort to upgrade phosphate ore or matrix and/or utilize low-grade phosphatic materials in order to obviate the requirements of the expensive beneficiation processes and loss of $P_2O_5$ content. For example, U.S. Pat. Nos. 2,143,865; 3,391,993; 4,042,666; and 4,113,184 describe various methods for treatment of phosphate rock prior to acidulation with sulfuric acid in a conventional phosphoric acid plant. In all of these prior patents, the phosphate ore is treated as with steam as in U.S. Pat. No. 2,143,865 to eliminate fluorine; with water and a defoaming agent as in U.S. Pat. No. 3,391,993 in producing dicalcium phosphate; formed into an aqueous slurry with a viscosity reducing agent as in U.S. Pat. No. 4,042,666 to reduce clay-swelling problems; or, combined with an additive for wet grinding of the rock as in U.S. Pat. No. 4,113,184.

In U.S. Pat. No. 2,571,866, there is described a process for the production of phosphate concentrate from Florida phosphate rock in which water is used to separate the slime or clay from the larger useful particles of phosphate followed by further processing to produce a phosphate concentrate. In U.S. Pat. No. 4,105,749, phosphoric acid is produced from a phosphate ore matrix which has been slurried with an organic solvent to remove impurities prior to acidulation with sulfuric acid.

British Pat. No. 852,538 discloses a process for enriching natural phosphates by reacting phosphate ore at temperatures of no higher than 50° C. with a dilute phosphoric acid solution which will impregnate the ore and cause impurities to flow away in the form of a solution. This treatment is to enrich the proportion of lime in the original ore and remove slimes and the like.

Phosphate rock feed of sufficiently high BPL content is currently processed in so-called wet process phosphoric acid plants utilizing a basic and well-known procedure for the acidulation of the phosphate rock by reaction of the rock with sulfuric acid to form phosphoric acid with subsequent reaction of the phosphoric acid, with for example, ammonia to produce monoammonium phosphate (MAP) and diammonium phosphate (DAP). The phosphoric acid formed in this process is marketable wet process phosphoric acid. In this reaction, a by-product is gypsum having the chemical formula $CaSO_4.2H_2O$. The BPL content of the rock used as feedstock in such processes will range from about 58% to about 68% BPL.

In these systems, the conventional wet process phosphoric acid technology accomplishes two primary objectives, namely: (1) phosphate rock acidulation, and (2) the growth of readily filterable calcium sulfate crystals either as the dihydrate (gypsum), or as the hemihydrate. Conventional phosphoric acid technology carries out both of these objectives essentially simultaneously which leads to a number of environmental and purification problems. The presence of excess strong sulfuric acid in the acidulation phase releases fluorides as HF, $SiF_4$ and/or $H_2SiF_6$. This poses serious fluoride emission and subsequent recovery problems. Furthermore, unless excess sulfate levels are carefully and closely controlled, minute gypsum crystals can and will blind rock particles and usually result in poor $P_2O_5$ recovery. The presence of free $H_2SiF_6$ in the acid system leads to severe scaling and excessive maintenance costs even with improved design features to minimize this effect.

Prior art is also known which acidulates phosphate rock with phosphoric acid and then recovers solid monocalcium phosphate by cooling the resulting solution and recovering the monocalcium phosphate. Processes of this type are disclosed, for example, in U.S. Pat. Nos. 2,567,227; 2,728,635; 3,494,735 and 3,645,676. None of these prior art processes, however, are concerned with low grade feedstocks.

In the above-identified previously issued U.S. Pat. Nos. 4,086,322 and 4,160,657 of this assignee, there are disclosed processes by which phosphate rock may be acidulated with phosphoric acid in the presence of potassium ion and silicon dioxide. These processes are useful as effective procedures for the elimination of fluoride evolution. The latest technology concerning this problem is the above-mentioned U.S. Pat. No. 4,160,657, which represents a departure from prior processes in providing for more economic utilization of potassium fluosilicate in the system wherein both phosphoric acid and potassium ion are regenerated and re-used as essential reactants.

U.S. Pat. Nos. 3,619,136 and 3,792,151 to Case disclose the reaction of phosphate rock with recycle phosphoric acid at temperatures of about 125°–180° F. (52°–83° C.) to form a solution of monocalcium phosphate in phosphoric acid, removing insolubles, and reacting the phosphoric acid solution with sulfuric acid to produce phosphoric acid and hydrated calcium sulfate, separating the hydrated crystals and recycling at least a portion of the phosphoric acid to the phosphate rock acidulation. These patents point out that under the conditions cited, fluorides are not substantially evolved but remain primarily unreacted and may be found with insoluble materials although a portion remains in the phosphoric acid solution product. These patents state that any grade of phosphate rock can be utilized in the process including mine run rock and Florida pebble rock. This patentee, however, does not teach how the slimes from low grade rock would be handled in the process. The working examples show treatment only of 70 BPL rock.

A substantial problem faced by the prior art in processing low-grade phosphate rock for the production of phosphoric acid and other products is the relative substantial proportion of slimes, sand and other components contained in the rock. These materials interfere in processing of the rock and particularly in the ability to obtain filterable gypsum crystals from the reaction product so as to provide the phosphoric acid material. Substantial prior teachings are available which show that the art has attempted to overcome this problem by various procedures to separate the silica, slimes and other insolubles. For example, U.S. Pat. Nos. 2,899,292 and 2,914,380 to Vickery describe processes wherein the phosphate rock is crushed, dissolved in phosphoric acid, and then attempts made to remove the silica and other insolubles in a separator. In U.S. Pat. No. 2,954,275 to Carothers et al, lime, which is more alkaline than phosphate rock, is added to phosphoric acid solutions and the mixture is then cooled so that a mixture of monocalcium phosphate and impurities are separated.

In U.S. Pat. No. 3,150,957 of Seymour et al., and in unpublished work by Seymour et al., low grade phosphate rock is acidulated with phosphoric acid and the impurities are decanted from the reaction mixture to provide a high grade phosphate rock. Thus, this process effects an initial partial digestion of the rock to extract monocalcium phosphate and other soluble and colloidal phosphates from the rock in fluid form. The unreacted rock residue may then be treated conventionally.

U.S. Pat. No. 4,284,614 to Ore describes a process wherein high alumina phosphate rock such as pebble, with or without comminution, is digested in phosphoric and sulfuric acid and the resultant phosphoric acid contains the metallic ions normally present in the treated rock and pebble. The metallic ions are then extracted from the acid by ion exchange with a water-immiscible organic sulphonic acid compound. After phase separation the organic phase containing the extracted metallic ions can be regenerated.

U.S. Pat. No. 3,919,395 describes an extraction process for the recovery of phosphorus compounds from both high and low grade phosphate ores, especially apatite-containing ores, using room temperature extraction of coarsely ground ore with dilute mineral acids in order to remove dissolved $R_2O_3$ impurities from the ore to upgrade the ore. In this patent, the low grade rock is initially treated with a dilute mineral acid, separating the spent acid which contains colloidal silicates, fines, and dissolved phosphates, and then reacting the residue with a stronger acid. In related U.S. Pat. No. 4,029,743, phosphate rock is acidulated with a mixture of phosphoric acid, sulfuric acid and water in a first mix tank and with sulfuric acid in a second mix tank, in the production and recovery of phosphoric acid. Gypsum is also recycled to the first attack stage. The patentee suggests that low grade rock can be used in the process.

Other patents are known which treat phosphate rock in order to remove slimes, silicas and other insolubles by various methods including the use of water and weak phosphoric acid. However, none of these patents describe a method whereby the rock can be placed in a form suitable for subsequent acidulation by phosphoric acid to recover valuable products wherein the insolubles are removed from the system and fluoride evolution is substantially reduced.

In none of this prior work are there described processes by which very low grade phosphate rock or ore such as matrix is processed in a wet process phosphoric acid plant to produce marketable wet process phosphoric acid, together with other useful and marketable products. The present invention meets this need in the art.

DISCLOSURE OF INVENTION

It is accordingly one object of this invention to provide a method for upgrading crude phosphate ore to place it in a form for acidulation by conventional processes.

A further object of the invention is to provide a method for upgrading of phosphate ore or matrix to remove slimes therefrom in order to increase the $P_2O_5$ and BPL contents of said phosphate ore and place it in a form suitable for acidulation and conversion of the calcium and phosphate contained therein.

A still further object of the invention is to provide a method for treatment of crude phosphate ore or matrix to upgrade the phosphate ore to phosphate rock by removal of slimes therefrom and to recover from said slimes the useful $P_2O_5$ content and produce useful products therefrom while solving a serious environmental problem caused by slime disposal.

Other objects and advantages of the present invention will become apparent as the description thereof proceeds.

In satisfaction of the foregoing objects and advantages, there is provided by this invention in its broadest embodiment a method for upgrading phosphate ore to phosphate rock by the removal of slimes therefrom, which comprises the steps of:

(a) contacting said phosphate ore with a phosphoric acid solution having a concentration of about 1 to 20 weight percent in a desliming unit for a sufficient time to form a suspension comprising calcium components, phosphate components, impurities and slimes;

(b) passing said suspension through a solids separator to separate a slurry of deslimed phosphate rock from a slime suspension and recovering the deslimed phosphate rock;

(c) removing the slime suspension to a separator and separating the slimes to provide a liquid filtrate; and (d) recycling the liquid filtrate to the desliming unit for reaction with additional phosphate ore.

In other aspects of the invention, the upgraded phosphate rock slurry may be ground to a size suitable for processing and the slimes recovered may be reacted with a mineral acid to recover a useful slime product having $P_2O_5$ values.

BRIEF DESCRIPTION OF THE DRAWINGS

Reference is now made to the drawings accompanying this application wherein.

DESCRIPTION OF PREFERRED EMBODIMENT

The present invention is concerned with methods for upgrading of crude phosphate ore to provide a product suitable for use in phosphoric acid plants which solubilize the phosphate rock and convert the calcium and phosphate values therein to useful products. The present invention has a substantial economic advantage in that phosphate ore, also called matrix, and other recognized crude phosphate products can be upgraded to make them useful as feed stocks to acidulation processes.

As pointed out above with respect to the prior art, present commercial phosphoric acid plants require that the phosphate rock be a relatively high quality feed such as concentrate from a flotation step which has a BPL content of in the range of 58-68%. At present, it is necessary that phosphate ore be processed through beneficiation plants in order to remove the slimes and sands therefrom. The removal of slimes and their disposal in beneficiation plants causes a serious environmental problem as the slimes are simply removed to a slime pond. The present invention overcomes this problem by converting the slimes into a useful product having $P_2O_5$ values. Further, since the present invention obviates the necessity of processing the ore through a phosphate beneficiation plant, the initial cost of the raw material will be substantially below that now available.

The present invention is particularly suitable for providing a raw material feed useful in processes in which phosphate rock is initially solubilized by an excess of phosphoric acid, and the resulting phosphoric acid solution of monocalcium phosphate is then reacted with sulfuric acid to produce gypsum and market grade phosphoric acid. Processes of this type are described in copending application Ser. No. 338,999 of the same assignee, filed of even date.

The present invention utilizes several embodiments in achieving the objects of the invention. The process of the invention is particularly beneficial as it enables one to upgrade crude phosphate ore or matrix by the removal of slimes therefrom to produce a slurry of relatively clean phosphate rock suitable for use in many phosphoric acid plants. A still further economic advantage of the present invention is that in prior processes of this type, removal of the slimes cause loss of the $P_2O_5$ values contained therein. In the present invention the slimes are removed from the crude phosphate ore but in a condition that the valuable $P_2O_5$ components contained therein can be recovered and converted to useful fertilizer components.

Figure 1:
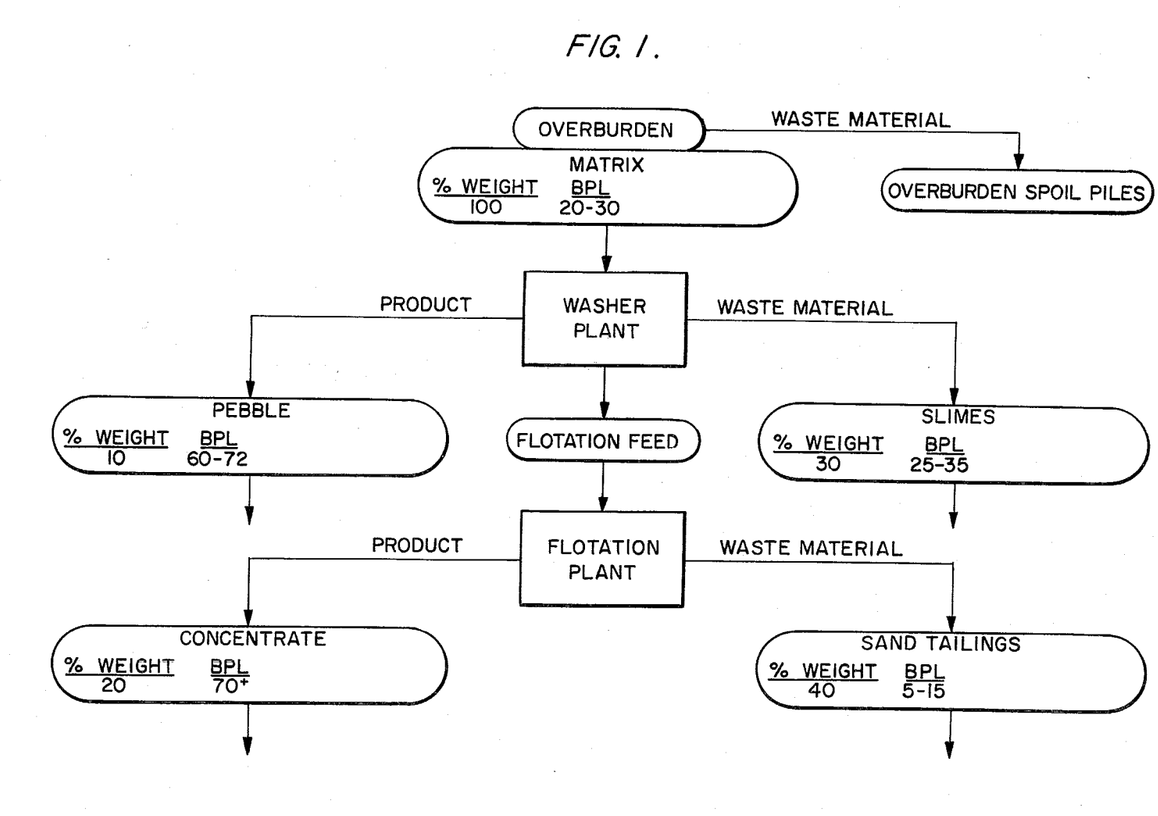
FIG. 1 is a typical example of a phosphate beneficiation plant showing how phosphate ore is conventionally processed to remove impurities and provide the several useful and wasteful products produced.

As pointed out above, FIG. 1 accompanying this application is a flow sheet which shows a conventional phosphate beneficiation plant. As may be seen the material mined from the ground is removed as matrix after removal of the overburden as waste material and the initial mining operation. In the example shown, this matrix may have a BPL content in the range of about 20 to 30 percent. The term "matrix" is a term of art and understood by those in the phosphate beneficiation industry as defining ore as removed from the ground in the mining operation.

The matrix is then formed into a slurry with water and piped to a washer plant where initial separation is made to remove waste material slimes in which case, as may be seen in the example, BPL contents in the range of about 25 to 35 percent are lost by discarding of the slimes. The other product removed at this stage is a so called pebble product which maintains a BPL content in the range of 60 to 70 percent and which is useful in certain areas. The pebble product is generally large particles separated from the main product in the washer plant.

The remaining intermediate product is called flotation feed, the flotation feed being subjected to a flotation operation in which sand tailings and other waste materials are removed to provide a product known as phosphate concentrate which in general is the preferred feed stock employed in commercial wet process phosphoric acid plants.

As will be seen from the flow sheet of FIG. 1, after initial mining of the phosphate ore or matrix, as much as 40 to 50 percent of the BPL values may be discarded with the slimes and the sand tailings. In addition, the several processing steps required to provide a phosphate concentrate is an expensive and time consuming operation resulting in a substantial need in the art for a process which can provide in an economical manner a useful phosphate rock feed from phosphate matrix. The present invention provides a process of this type.

Figure 2:
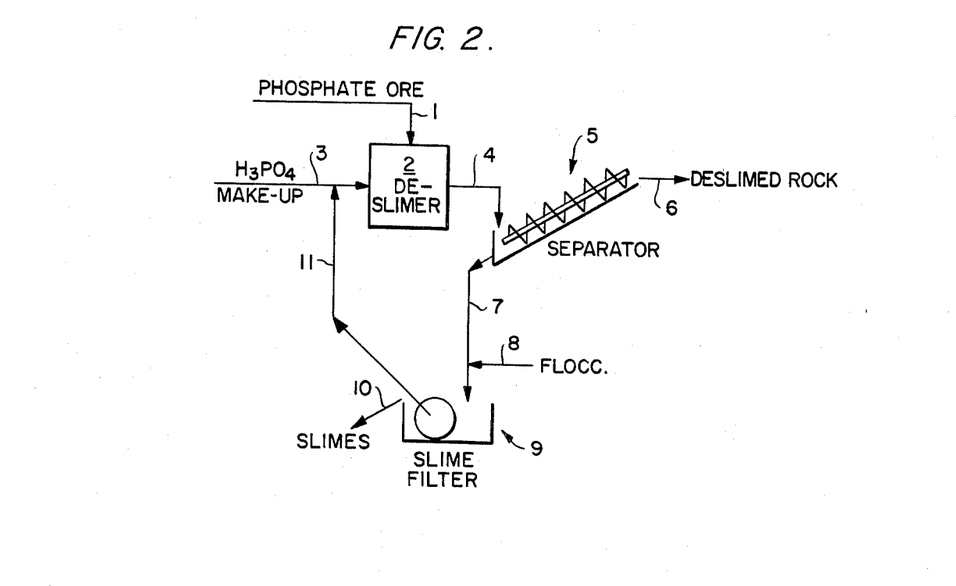
FIG. 2 is a flow sheet showing the broadest embodiment of the invention wherein the phosphate ore is deslimed with phosphoric acid and the slime and deslimed rock are separated.

The process of the invention is described in its broadest embodiment in FIG. 2 accompanying the invention. In FIG. 2 it will be seen that phosphate ore from line 1 is passed into deslimer 2 for reaction with phosphoric acid from line 3. The phosphoric acid may be fresh phosphoric acid but is preferably recycled phosphoric acid from a subsequent step optionally combined with fresh makeup phosphoric acid or dilute phosphoric acid from the gypsum pond. The acid is most preferably a weak phosphoric acid having a concentration of about 1 to about 20 weight percent. While the invention is described herein with reference to the use of phosphoric acid as the desliming reagent, it will be understood that other mineral acids could be used to react with the phosphate ore and extract the slimes therefrom. However, as the resulting deslimed phosphate rock is to be used in a phosphoric acid plant, it is highly preferred that phosphoric acid be the desliming reagent.

The deslimer may be any type of reactor which will provide good contact between the weak phosphoric acid and the phosphate ore. Agitation is desirable and an attrition scrubber is a particularly beneficial apparatus to be used in the desliming step. the desliming reaction is preferably carried out at about ambient temperatures preferably from about 20° to 50° C. under atmospheric pressure and with a residence time ranging from about one-half to two hours. The phosphate ore may be ground or unground although the embodiments shown in FIGS. 4 and 5 accompanying the application are particularly suitable for operation with unground phosphate ore.

After completion of the desliming step in reactor 2, the resultant solid slurry which contains the slimes as a suspension is removed by line 4 and passed to a separator 5. Separator 5 may be any desired apparatus which will effect a separation between the slime suspension and the ore slurry which has now been upgraded to be deslimed phosphate rock. The deslimed phosphate rock slurry is removed at 6 while permitting the slime suspension to separate from the rock with removal at 7. From the separation apparatus 5 there is recovered the deslimed rock at 6 which has been upgraded so as to have a higher BPL content.

From the separator 5 is recovered at 7 the slime suspension. In a preferred embodiment the slime suspension, which conventionally is difficult to separate, is treated with a flocculant from line 8 and the resulting flocculated mixture passed to a slime separator such as slime filter 9. Any conventional flocculant may be used at this stage. Preferred flocculants include the well known polyacrylamides which are available commercially under the tradename "Magnifloc". The flocculant is used in the amount of about 2 to 10 ppm per 100 parts of slime emulsion. Magnifloc 905N is a particularly suitable flocculant. From slime filter 9 the slimes are removed at 10 and either discarded or converted as described herein. After separation of the slime solids the resulting filtrate, which contains phosphoric acid, can be recycled by line 11 to the deslimer for additional reaction with phosphate ore.

As pointed above, the product resulting from this conversion step is a deslimed phosphate rock from which a major impurity has been removed. The resulting deslimed phosphate rock is particularly suitable as feed material to processes which convert the useful components therein to phosphoric acid and gypsum. A process of this type is particularly described in the commonly assigned application Ser. No. 338,999, filed of even date.

Figure 3:
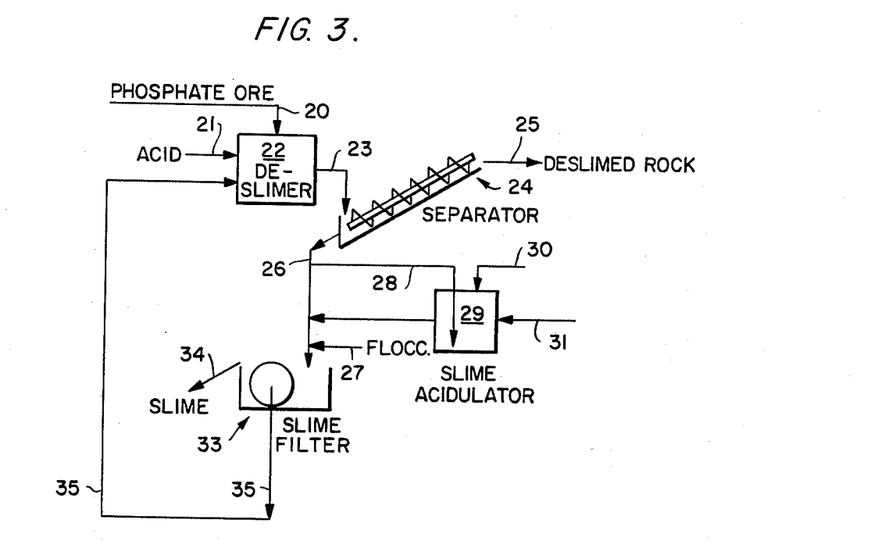
FIG. 3 is a further embodiment of the invention wherein the phosphate ore is deslimed with phosphoric acid, the products are separated and the resulting slime solids are processed to produce useful products.

A further embodiment of the invention is shown in FIG. 3 wherein the phosphate ore from line 20 is reacted with 2 to 10 parts of 1 to 20 weight percent phosphoric acid from line 21 in deslimer 22. The resulting suspension is then removed from deslimer 22 by line 23 to slime separator 24. The slimes in suspension form are removed at 26 and separated from the deslimed phosphate rock product recovered at 25.

The slime suspension in line 26 is divided into two portions with one portion being removed by line 28 for conversion into useful products and the other portion in line 26 being flocculated with a conventional flocculant from line 27 and passed to slime separator 33. In slime separator 33, which is preferably a filter the slime solids are removed at 34 for discard or conversion, and the slime filtrate is recovered at 35, the filtrate comprising a weak phosphoric acid solution which preferably is recycled to the deslimer 22.

In the meantime the portion of suspended slimes at line 28 is passed to a slime acidulator 29 for reaction with phosphoric acid from line 30. In this reaction, finely divided encapsulated rock is acidulated by the weak phosphoric acid. The reaction involves at least a stoichiometric amount and preferably an excess of the weak phosphoric acid. This reaction serves to complete acidulation of $P_2O_5$ or phosphate rock contained in the slimes. The remaining slime solids then are passed to the slime filter 33 by line 32 for processing as described.

Figure 4:
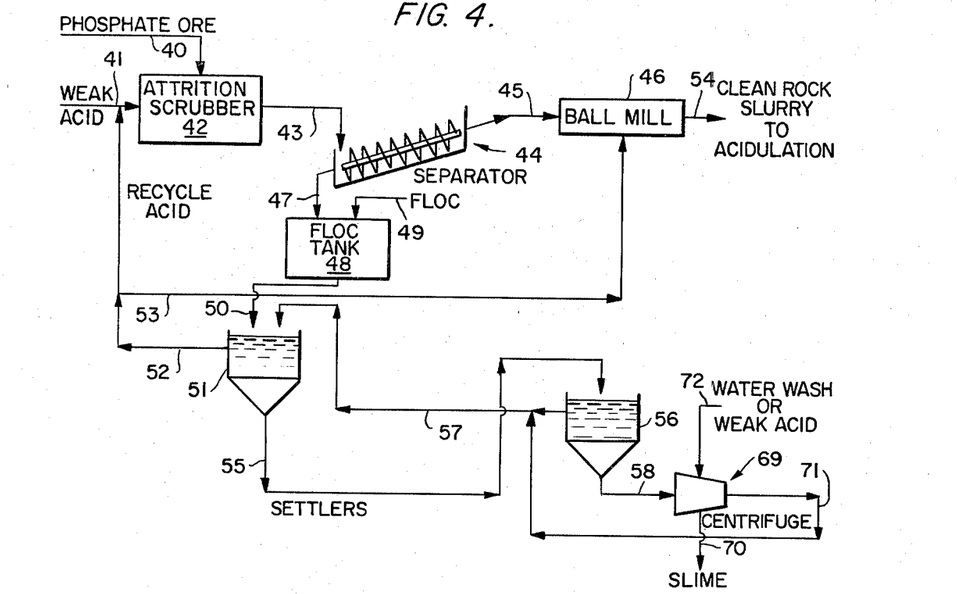
FIG. 4 represents a still further embodiment of the invention where an unground phosphate ore is deslimed and the resulting phosphate rock, after removal from the slimes, is ground to provide a clean rock slurry suitable for acidulation, and the slime products are processed to produce useful $P_2O_5$ containing products.

A further embodiment shown in FIG. 4 is particularly suitable for treatment of unground phosphate ore and the recovery of useful products from the slime impurity. Thus, in this embodiment, phosphate ore, preferably from line 40, and weak phosphoric acid from line 41, are introduced into attrition scrubber 42 for reaction at the preferred temperature, of about room temperature up to about 80° C., and preferably 20° to 50° C., using about 2 to 10 parts of phosphoric acid solution per part of phosphate ore. The residence time in the attrition scrubber is preferably about one-half to two hours when processing about 100 units of matrix. The phosphoric acid may be fresh phosphoric acid of 1 to 20 weight percent concentration or recycled phosphoric acid, but is preferably recycled phosphoric acid wash from the gypsum filter or pond, but using fresh make-up acid as necessary as shown in FIG. 4.

From attrition scrubber 42 a slurry of phosphate ore containing the slimes in suspension form is removed by line 43 to separator 44 to separate the slurry of phosphate rock from the slime emulsion. The unground rock slurry is recovered at 45 and transferred to ball mill 46 for grinding.

In the meantime, the slime suspension from separator 44 is removed by line 47 to floc-tank 48 where flocculant is added from line 49 in an amount of preferably 2–10 ppm of flocculant per 100 parts of slime. In the flocculation tank 48, the flocculant causes the slime solids to separate from the suspension emulsion and the resulting slurry is then passed by line 50 to settler 51 where an initial separation is made between slime solids and the process liquids which comprise a weak $P_2O_5$ aqueous solution. In a preferred embodiment, the overflow from the settler which is the $P_2O_5$ containing aqueous solution is removed at 52 for recycle to the attrition scrubber by combining with weak acid in line 41. However, in a preferred embodiment, at least a portion of the $P_2O_5$ containing process liquids are removed at 53 and passed to ball mill 46 to serve as the liquid for grinding of the unground rock slurry in ball mill 46. From ball mill 46 there will then recovered a clean rock slurry at 54 which is already in slurry form for use in a phosphoric acid plant.

In the meantime, the settler underflow from line 55 is removed and passed to a second settler 56 to effect additional separation of the solids and liquids. From the second settler the overflow is removed at 57 and recycled to the first settler 51. The underflow is removed at line 58 to centrifuge 69 where the slimes are recovered at 70 and the liquids are recycled at 71 to the overflow from the settler. The slime solids are washed with water or weak acid from line 72, which liquids can then be recycled in the system since the wash will remove $P_2O_5$ values. Additional settlers in series can be used to effect more complete conversion of the slimes.

The slime solids recovered at 70 from the centrifuge will contain about 10 to 25 weight percent $P_2O_5$ and thus are useful for conversion into useful products by reaction with phosphoric acid or sulfuric acid as described above in the description of FIG. 3.

Figure 5:
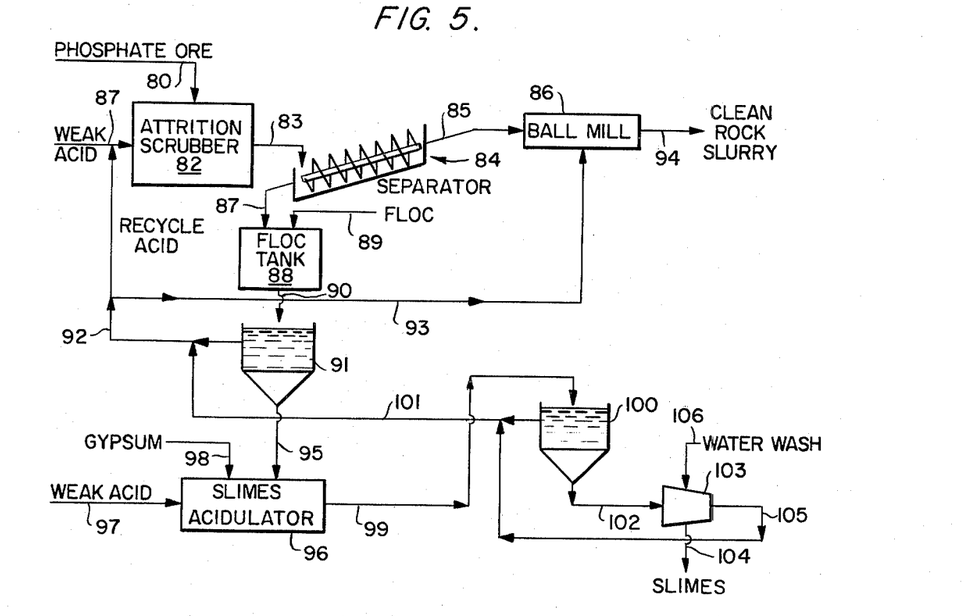
FIG. 5 is a still further embodiment of the invention wherein recycled acid recovered from the slime separation step is used for additional desliming as well as for initial acidulation of an unground phosphate rock slurry and the slimes are treated to produce a useful product.

A still further embodiment of the invention is shown in FIg. 5 which is generally the same as FIG. 4 in that upground phosphate ore from line 80 and weak phosphoric acid from line 81 are contacted in attrition scrubber 82 to effect desliming. The resulting product is removed at 83 to slime separator 84 from which phosphate ore solids with the slimes removed are recovered at 85 and passed to ball mill 86. The slime emulsion from the slime separator is removed at 87 to floc-tank 88 where flocculant is added from 89 and the resulting flocculated mixture is passed by line 90 to settler 91. The overflow from the settler 91 is recycled as weak phosphoric acid by line 92 for desliming, except that at least a portion is removed at 93 and passed to ball mill 86 to serve as the processing liquids for the grinding operation in the ball mill. From the ball mill there is then recovered at line 94 a clean phosphate rock slurry suitable for use in a phosphoric acid plant.

In the meantime, the underflow from the slime settler 91 is passed by line 95 to slime acidulator 96 where the slime solids are reacted with weak phosphoric acid from 97 to acidulate finely divided encapsulated rock. Gypsum can be added from line 98 to facilitate separation in the settler. This reaction mixture is then removed by line 99 to settler 100 to separate the processed liquids from the solids. Thus, the overflow liquids from settler 100 are removed at 101 and recycled to be combined with the process liquids suitable for recycle in line 92.

The solids from settler 100 are removed at 102 to centrifuge 103 from which the slimes are removed at 104. The liquids from the centrifuge are recycled by line 105 for combining with the processed liquids from settler 100. The solids in centrifuge 103 are washed with water or weak phosphoric acid from 106, which wash liquids are then combined with the processed liquids.

The slime solids recovered at 104 contain $P_2O_5$ values, and can be converted to useful fertilizer products as described for the slime solids removed from settler 91.

As pointed out above, the resulting upgraded phosphate ore is eminently suitable as a phosphate rock feed to phosphoric acid processes which solubilize the rock and convert the calcium to gypsum and phosphate to phosphoric acid, as well as improvements on such processes. Thus, the upgraded phosphate ore is in a form suitable to replace the more expensive phosphate rock concentrate now used as feedstock in such processes.

It will be recognized that the phosphate ore produced according to the invention still contains substantial amounts of sand which will need to be removed prior to production of phosphoric acid. This is easily handled by simply effecting a separation of the sands after solubilization of the rock with mineral acid as described, for example, in commonly assigned, copending application Ser. No. 338,999.

As will be understood from the above description, the invention provides a method by which substantial portions of the slimes may be removed from phosphate ore or matrix to upgrade the ore to phosphate rock. It has been found that essentially all of the slimes can be removed from the ore by this method and the removed slimes comprise colloidal size particles of clay with some colloidal size particles of phosphate rock. Also, removal of the slimes causes a $P_2O_5$ loss from the ore of 10–30 percent of the weight of the ore which contain about 10–20 percent of the total $P_2O_5$ in the rock. This $P_2O_5$ can be almost completely recovered by the methods described herein in conversion of the slimes into normal superphosphate (NSP) or triple superphosphate (TSP) or by acidulating the finely divided encapsulated rock.

The invention is illustrated by the following working examples or specific embodiments. However, the invention is not to be considered as limited thereto. In the examples and throughout the specification, parts are by weight unless otherwise indicated.

EXAMPLE 1

To illustrate the concepts embodied in the desliming circuit, a laboratory scale experiment was conducted. A weak acid solution containing 3 wt.% $P_2O_5$ was mixed at high speed with a sample of Florida phosphate matrix at a ratio of 10 parts acid to 1 part matrix. The resulting slurry was allowed to settle for a short period of time. The clay containing slimes in the overflow were decanted and flocculated with a nonionic polyacrylamide. The concentrated slime slurry was vacuum filtered and solids washed with distilled $H_2O$. The underflow material contained mostly unreacted deslimed phosphate rock. This material was mixed with a 3 wt.% $P_2O_5$ containing solution at approximately a 1 to 1 ratio. The resulting mixture was ground in a ceramic ball mill. The grinding media occupied approximately 50% of the usable volume of the vessel. The final slurry was vacuum filtered and the solids washed with distilled $H_2O$. All solids and filtrates were analyzed for $P_2O_5$ content.

Table I illustrates the salient features of the experiment.

TABLE I

|  | Total $P_2O_5$ (gms) | C.I. $P_2O_5$ (gms) | C.S. $P_2O_5$ (gms) | Wt. Comp. (gms) |
|---|---|---|---|---|
| INPUT | | | | |
| Matrix | 12.17 | 10.30 | 1.87 | 100.52 |
| Weak Acid | 33.01 | — | 33.01 | 1325.42 |
| Total INPUT | 45.18 | 10.30 | 34.88 | 1425.94 |
| OUTPUT | | | | |
| Dry Slimes | 1.956 | 0.951 | 0.916 | 25.37 |
| Dry Clean Rock | 10.337 | 6.828 | 3.43 | 65.34 |
| Clean Rock and Slime Filtrates | 29.12 | — | 29.12 | 1242.57 |
| Total OUTPUT | 41.41 | 7.78 | 33.47 | 1333.28 |
| % $P_2O_5$ in Dry Slimes (based on component $P_2O_5$ in Input Matrix) | 16.07% | 9.23% | 48.98% | |
| % $P_2O_5$ in Dry Slimes (based on Total $P_2O_5$ in Input Matrix) | 16.07% | 7.81% | 7.53% | |

EXAMPLE 2

This example illustrates the conversion of the slimes into useful products. Wet slimes are removed from matrix which contain about 18% $P_2O_5$ (Tot), 9% C.I. $P_2O_5$, and 6% W.S. $P_2O_5$. The citrate insoluble $P_2O_5$ is recovered by converting the slime into normal superphosphate (NSP) or triple superphosphate (TSP). Alternatively, the slimes can be further processed to recover most of the $P_2O_5$ as wet acid.

In this example, a 100 gram sample of recovered slimes were treated with about 50 grams of 98% sulfuric acid at 110° C. overnight to produce a sample of normal superphosphate. The analyses of the normal superphosphate is given below:

| Component | Wt. % |
|---|---|
| $Al_2O_3$ | 1.41 |
| CaO | 16.93 |
| $Fe_2O_3$ | 0.56 |
| MgO | 0.25 |
| $P_2O_5$ (Total) | 19.48 |
| $P_2O_5$ (Water Sol.) | 19.48 |
| $P_2O_5$ (C.I.) | 0.03 |
| F | Nil |

Samples of triple superphosphate are also prepared from slimes. One portion of slime is treated with wet acid (46% $P_2O_5$) (A), and a second portion is treated with wet acid and gypsum (B). The samples are heated at 110° C. overnight. The results are as follows.

TABLE II

| Sample | A | B |
|---|---|---|
| Wt. Wet Slimes (47% moisture), gms | 100 | 100 |
| Wt. Wet Acid (46% $P_2O_5$), gms | 41 | 41 |
| Wt. Gypsum[1], gms | 0 | 10 |
| Analysis (Wt. %) | | |
| $Al_2O_3$ | 2.14 | 1.91 |
| CaO | 12.12 | 14.66 |
| $Fe_2O_3$ | 1.31 | 1.06 |
| MgO | 0.44 | 0.42 |
| $P_2O_5$ (Total) | 55.04 | 48.94 |

TABLE II-continued

| Sample | A | B |
|---|---|---|
| $P_2O_5$ (Water Soluble) | 35.63 | 36.25 |
| $P_2O_5$ (C.I.) | 0.06 | 0.03 |
| F | 0.32 | 0.28 |
| $SiO_2$ | 9.68 | 8.61 |

[1]The gypsum contained about 7% water soluble $P_2O_5$.

For the sample that contained gypsum, the ratio of water soluble $P_2O_5$ to total $P_2O_5$ was 0.74; whereas, in the sample with no gypsum, the ratio was 0.65.

EXAMPLE 3

In this example, the citrate insoluble $P_2O_5$ in the slimes was acidulated by additional processing of the slimes.

In this series of laboratory tests, filtered slime was reslurried with monocalcium phosphate solution. In some of the tests, wet acid (35% $P_2O_5$) was added, and in others, wet acid and gypsum were added. The mixtures were stirred at 40° C. or 80° C. for one or three hours. At the end of the stirring period, the mixtures were flocculated with Magnifloc 905N, and the solids were filtered, washed, and dried. The results are given in Table III.

TABLE III

REACTION OF FILTERED SLIMES WITH MONOCAL SOLUTION AND WET ACID

| Run No. | A | B | C |
|---|---|---|---|
| Wt. of slimes (gms) | 20 | 20 | 20 |
| Wt. of 17% Monocal Solution | 200 | 200 | 200 |
| Wt. of 35% Wet Acid | 0 | 0 | 200 |
| Reaction Time, Hrs. | 1 | 3 | 1 |
| Temp., °C. | 80 | 80 | 80 |
| % of $P_2O_5$ Extracted from Slime | 26 | 24 | 97 |
| % of $Al_2O_3$ Extracted from Slime | 59 | 67 | 93 |

At 80° C. with no additional wet acid, only about 25% of the $P_2O_5$ was extracted at 1 or 3 hours, whereas with additional wet acid, essentially all of the $P_2O_5$ was extracted at 1 hour. Also, the $Al_2O_3$ (clay component) is acidulated with the $P_2O_5$ (rock).

EXAMPLE 4

In this example, an apparatus similar to that of FIG. 4 is employed with unground phosphate matrix as the feed. Thus, 100 parts of unground matrix is introduced into an attrition scrubber with 800 parts of a 15% phosphoric acid solution. The reactants are reacted in the scrubber for 1.5 hours at 40° C. The resulting mixture is removed to a screw classifier and the ore solids separated from the slime emulsion and passed to a ball mill. To the slime emulsion is added 10 ppm of Magnifloc 905N as a flocculant and the slimes are flocculated. The resulting slurry is removed to a settler from which the acid overflow is removed. After removal, the overflow is divided into two portions. One portion is recycled to the attrition scrubber as weak phosphoric acid for additional desliming and the other portion is passed to the ball mill as conditioning liquids for grinding the ore. The residence time in the ball mill is 1 hour at room temperature from which there is recovered a deslimed phosphate rock slurry.

In the meantime, the underflow from the settler containing the slime solids is removed to a second settler for further separation. The overflow weak acid solution is recycled to the first settler and the underflow solids is removed to a centrifuge for separation. The solids in the centrifuge are washed with a 5% $H_3PO_4$ solution and the wash water is recycled to the settler. Slime solids containing 21% citrate soluble $P_2O_5$ are recovered.

The invention has been described herein with reference to a certain preferred embodiment. However, as obvious variations thereon will become apparent to those skilled in the art, the invention is not to be considered as limited thereto.

We claim:

1. A method for upgrading unground low grade phosphate ore to remove slimes therefrom and provide a phosphate ore suitable for acidulation which comprises the steps of:
   (a) contacting unground phosphate ore with phosphoric acid having a concentration of about 1 to 20 weight percent in an amount of about 2 to 10 parts of phosphoric acid per part of phosphate ore in a desliming unit to form a suspension containing the slimes and the phosphate ore;
   (b) removing the suspension to a solids separator and separating phosphate ore slurry solids from the suspension containing the slimes;
   (c) passing the phosphate ore to a grinding unit and grinding the phosphate ore solids in the presence of a weak phosphoric acid solution to provide a phosphate rock slurry suitable for acidulation;
   (d) removing the suspension containing the slimes and flocculating the slime solids to cause precipitation of the slime solids and provide separation between the slime solids and the phosphoric acid process liquids;
   (e) removing the resulting mixture to separation means and separating the slime solids from the process liquids;
   (f) recycling at least a portion of the process liquids to the desliming unit and at least a portion to the grinding unit;
   (g) removing the slime solids and reacting with weak phosphoric acid to acidulate finely divided phosphate rock contained therein and form a reaction mixture;
   (h) removing the reaction mixture to a separation device and separating the slime solids from the process liquids;
   (i) washing the slime solids with water, combining the wash water with the process liquids and recycling to be combined with the process liquids recovered from the separator in step (e); and
   (j) recovering the slime solids which contain $P_2O_5$ values.

2. A method according to claim 1 wherein the low grade ore is matrix.

* * * * *